United States Patent [19]

Murakami et al.

[11] Patent Number: 4,609,776

[45] Date of Patent: Sep. 2, 1986

[54] COORDINATE INPUT DEVICE WITH DISPLAY

[75] Inventors: Azuma Murakami, Tokyo; Yoshinori Taguchi; Tsuguya Yamanami, both of Ageo, all of Japan

[73] Assignee: Wacom Co., Ltd., Japan

[21] Appl. No.: 689,353

[22] Filed: Jan. 7, 1985

[30] Foreign Application Priority Data

Jan. 13, 1984 [JP] Japan .................................. 59-4479

[51] Int. Cl.⁴ ............................................. G08C 21/00
[52] U.S. Cl. ..................................................... 178/18
[58] Field of Search .............................. 178/18, 19, 20; 324/208; 33/1 M; 364/520; 340/706, 700; 367/907

[56] References Cited

U.S. PATENT DOCUMENTS 3,962,679  6/1976  Engelbnecht ..................... 178/18 X
4,205,199  5/1980  Mochizuki ......................... 178/18 X
4,482,784  11/1984 Whefstone ............................ 178/19
4,514,688  4/1985  Whefstone ............................ 178/18

Primary Examiner—Stafford D. Schreyer
Attorney, Agent, or Firm—Pollock, VandeSande & Priddy

[57] ABSTRACT

A coordinate input device with display comprises a tablet having a plurality of X-direction magnetostrictive transmission mediums arranged in parallel, a plurality of Y-direction magnetostrictive transmission mediums arranged in parallel and superposed on the X-direction transmission mediums substantially orthogonally thereto, and first and second coils arranged over substantial regions of the magnetostrictive transmission mediums. A magnetic pen is used to produce just enough magnetism for causing a local increase of the electro-mechanical coupling coefficient in the magnetostrictive transmission mediums in the tablet.

5 Claims, 8 Drawing Figures

COORDINATE INPUT DEVICE WITH DISPLAY

BACKGROUND OF THE INVENTION

1. Field of the Invention

The present invention relates to a coordinate input device with display, capable of transmitting data such as hand-written characters and patterns through a telephone circuit or other suitable telecommunication line and displaying such data transmitted thereto through the telephone circuit.

2. Description of the Prior Art

Nowadays, apparatus known as "telecopier" or "facsimile" are broadly used as means for transmitting pattern data to remote places through telecommunication lines such as telephone circuits. This type of apparatus, however, can transmit only data such as characters and patterns which are already written or printed on sheets of paper. With this type of apparatus, it is not possible to directly input by hand writing the character and pattern data to be transmitted. In addition, this type of apparatus requires an impractically long time for the data transmission and hence has only a poor real-time characteristic.

SUMMARY OF THE INVENTION

Object of the Invention

Accordingly, a first object of the invention is to provide a coordinate input device with display, which permits hand-write inputting of data to be transmitted through telecommunication lines such as a telephone circuit to a similar device in a remote place, and capable of directly displaying data transmitted through the line from the remotely located similar system.

A second object of the invention is to provide a coordinate input device with display, wherein the data to be transmitted is inputted by a cordless position appointing magnetism generator which is not connected to any stationary part of the system through a cord, so that the inputting operation and the observation of the displayed data can be made without the hinderance of a cord.

A third object of the invention is to provide a coordinate input device with display, wherein the inputting of the data to be transmitted is made by a position appointing magnetism generator across the thickness of the display, regardless of the type and thickness of the display.

To these ends, according to the invention, there is provided a coordinate input device with display comprising: a tablet having a plurality of X-direction magnetostrictive transmission mediums arranged in parallel, a plurality of Y-direction magnetostrictive transmission mediums arranged in parallel and superposed to the X-direction transmission mediums substantially orthogonally thereto, and first and second electromagnetic converters arranged over substantial regions of the magnetostrictive transmission mediums; a tabular display superposed to the tablet and having a display area substantially equal to the position detection area on the tablet; a position appointing magnetism generator capable of producing a magnetism just enough for causing a local increase of electro-mechanical coupling coefficient in the magnetostrictive transmission mediums in the tablet; a position detecting circuit adapted to supply a pulse current to one of the first and second electromagnetic converters such as to generate magnetostrictive vibration wave in a reference position on each magnetostrictive transmission medium or a position appointed by the position appointing magnetism generator, the position detecting circuit being further adapted to measure the time duration between the moment at which the magnetostrictive vibration wave is generated and a moment at which the magnetostrictive vibration wave has reached the appointed position or the reference position, thereby detecting the coordinate values of the position appointed by the position appointing magnetism generator; a display control circuit adapted for driving the display in such a manner that the position corresponding to the coordinate values is displayed on the display; a signal modulating/demodulating circuit adapted for converting the position data expressed by the coordinate values into a signal suitable for transmission through a transmission line and vice versa; and a processing circuit for controlling the position detecting circuit, the display control circuit and the modulating/demodulating circuit.

In this coordinate input device, it is possible to appoint a position on the tablet highly precisely through a simple operation by means of the position appointing magnetism generator from a position remote from the tablet, i.e., from a position above the display which is superposed to the tablet. In addition, the position data thus inputted is displayed on the display on the tablet for an easy visual check. The inputted position data, which represent characters and patterns, can be transmitted to a similar device in a remote station through, for example, telephone circuit. In addition, the position data transmitted from such a remote station can be displayed on the display for easy visual confirmation.

These and other objects, features and advantages of the invention will become clear from the following description of the preferred embodiment when the same is read in conjunction with the accompanying drawings.

DESCRIPTION OF THE PREFERRED EMBODIMENT

Principle of the Invention

Figure 1:
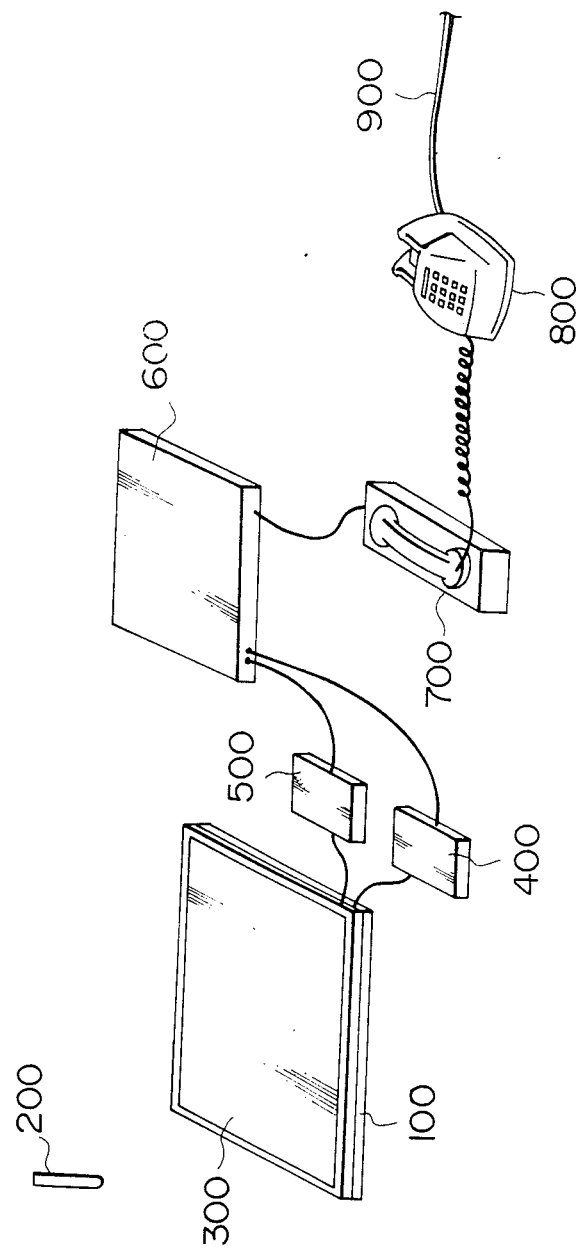
FIG. 1 is a schematic illustration of an embodiment of the coordinate input device with display in accordance with the invention.

Before turning to the detailed description of the invention, an explanation will be made first as to the principle of the invention, in order to facilitate an understanding of the invention.

When a magnetostrictive vibration wave is propagated through a magnetostrictive transmission medium, a part of the mechanical vibration energy is converted into magnetic energy to cause a local change in the magnetic field at the position where the vibration wave actually exists. The level of the change in the magnetic field is increased and decreased substantially in proportion to a coefficient of conversion from the mechanical energy to the electric energy. This coefficient will be referred to as "electro-mechanical coupling coefficient", hereinunder. The electro-mechanical coupling coefficient is maximized in a certain range of level of biasing magnetic field. Therefore, if a magnetic bias of a level just for increasing the electro-mechanical coupling coefficient is applied by a position appointing magnetism generator to a specific portion of a magnetostrictive transmission medium surrounded by a coil substantially over its entire length, a large change in the magnetic field is caused at the moment when such portion of the transmission medium is reached by the magnetostrictive vibration wave propagating through the transmission medium so that a high voltage is induced in the coil by the magnetostrictive vibration wave at this moment. It is possible to know the time length required for the magnetostrictive vibration wave to reach the position appointed by the position appointing magnetism generator and, hence, the appointed position by detecting the timing of induction of the high voltage in the coil.

The amplitude of the magnetostrictive vibration wave caused by a momentary change in the magnetic field applied to the magnetostrictive transmission medium is also changed in proportion to the electro-mechanical coupling coefficient. Therefore, if a certain portion of a magnetostrictive transmission medium surrounded substantially over its length by a coil is appointed magnetically by a position appointing magnetism generator which is able to apply magnetism of a level just capable of causing an appreciable increase in the electro-mechanical coupling coefficient, a magnetostrictive vibration wave of a large amplitude is generated only in the appointed portion of the magnetostrictive transmission medium. A large electromotive force is induced in another coil disposed on one end of the magnetostrictive transmission medium, when this coil is reached by the magnetostrictive vibration wave. It is, therefore, possible to detect the appointed position by sensing the timing of induction of the electromotive force in this coil.

The position signal in the form of the timing of induced voltage may be inputted to a computer and displayed, through a suitable driver unit, on a suitable display such as a liquid crystal display having liquid crystal elements and electrodes arranged in a lattice-like form. This display can be superposed on a tablet constituted by a multiplicity of magnetostrictive transmission mediums arranged in the form of a matrix. It is quite easy to arrange such that the magnetic field formed by the position appointing magnetism generator effectively acts on the magnetostrictive transmission medium of the tablet across the thickness of the display superposed on the tablet. In addition, a permanent magnet can be used suitably as the position appointing magnetism generator capable of producing sufficiently strong magnetic field. It is, therefore, possible to appoint a position on the tablet by a cordless magnetism generator, e.g., a permanent magnet and to directly display the appointed position on the display. By arranging such that the lines and columns of the magnetostrictive transmission mediums in the tablet correspond to those of the display elements in the display, it is possible to appoint the position on the tablet across the thickness of the display.

Thus, the invention provides a coordinate input device with display, in which a position on the tablet is appointed by a cordless magnetism generator across the thickness of the display superposed on the tablet and is displayed on the display superposed on the tablet as if the point representing the appointed position is "written" directly in the display.

Description of the Embodiment

FIG. 1 is a schematic perspective view of an embodiment of the coordinate input device with display in accordance with the invention. This embodiment has position appointing magnetism generator 200 (referred to simply as "magnetic pen", hereinunder) for appointing a coordinate position on a tablet 100. The system further has a planar display 300 superposed on the tablet 100, and various circuit means such as a position detecting circuit 400 for detecting the coordinate position on the tablet 100 appointed by the magnetic pen 200, a display control circuit 500 for driving the display 300 a processing circuit 600, and a modulating/demodulating circuit 700 such as an acoustic coupler for modulating data signal into signal suitable for transmission and demodulation of the transmitted signal into data signal. Numerals 800 and 900 denote, respectively, a telephone and a telephone circuit.

Figure 2:
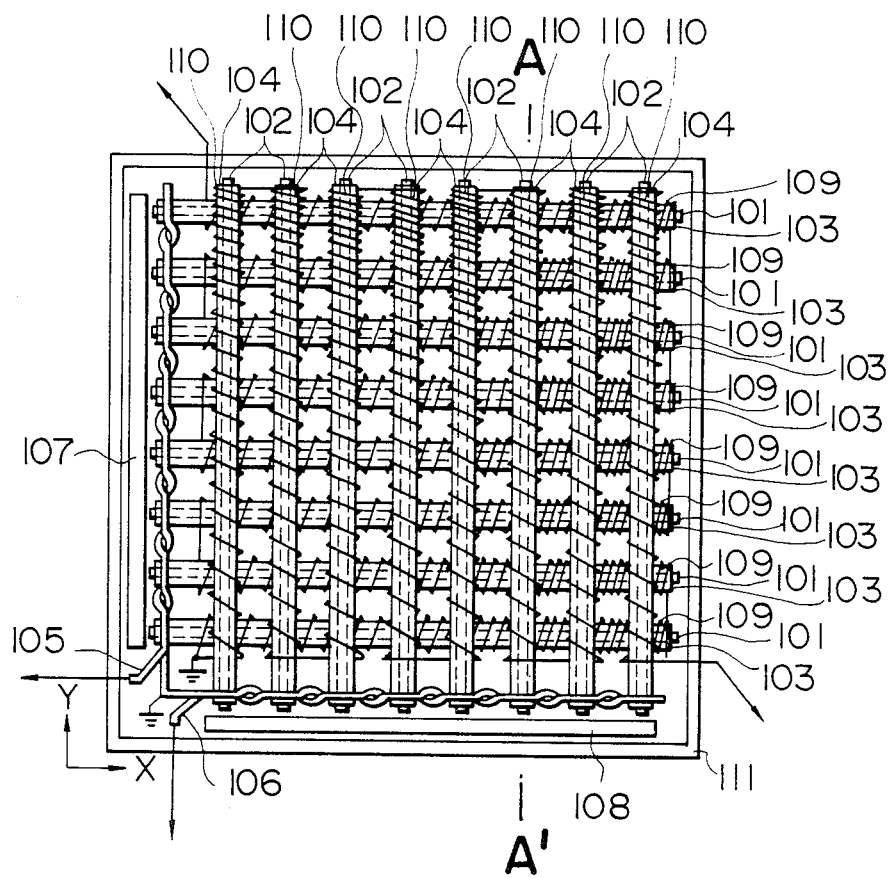
FIG. 2 is a plan view of a tablet constituting a part of a display.
Figure 3:
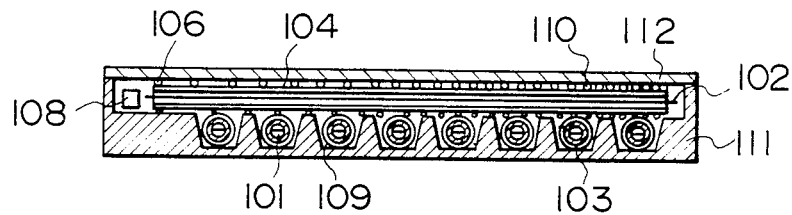
FIG. 3 is a sectional view taken along the line A-A' in FIG. 2.

FIG. 2 is a plan view of a tablet 100, while FIG. 3 is a sectional view taken along the line A-A' in FIG. 2. From these Figures, it will be seen that the tablet 100 is constituted by a plurality of X-direction magnetostrictive transmission mediums 101 arranged in parallel and a plurality of Y-direction magnetostrictive transmission mediums arranged in parallel and substantially orthogonally to the X-direction magnetostrictive transmission mediums. The magnetostrictive transmission mediums 101,102 can be produced from any ferromagnetic material. In order to produce a strong magnetostrictive vibration wave, however, it is advisable to use a material having a large magnetostrictive effect, such as an amorphous alloy rich in iron. It is also preferred that the material of the magnetostrictive transmission medium has a small coercive force so that it may not be easily magnetized when approached by the magnet. Typical examples of such amorphous alloys are $Fe_{67}CO_{18}B_{14}Si_1$ (atom %) and $Fe_{81}B_{13.5}Si_{3.5}C_2$ (atom %).

Each of the magnetostrictive transmission mediums 101 and 102 has an elongated linear form with a rectangular or a circular cross-section. When the medium has a rectangular cross-section, the width is preferably on the order of several millimeters (mm), while the thickness is preferably selected to range between several micron meters ($\mu$m) and several tens of micron meters ($\mu$m). As is well known to those skilled in the art, the amorphous alloy can be produced easily in the form of a thin ribbon having a thickness of 20 to 50 micron meters ($\mu$m), so that the magnetostrictive transmission mediums can be formed without substantial difficulty by simply splitting the ribbon into thin strips or lines. In the described embodiment, magnetostrictive transmission medium is produced from an amorphous alloy $Fe_{81}B_{13.5}Si_{3.5}C_2$ (atom %) in the form of a thin strip of 2 mm wide and 0.02 mm thick.

Each of the X-direction magnetostrictive transmission mediums 101 is housed in an elongated cylindrical sheath 103 made of, for example, a synthetic resin. Each of the Y-direction magnetostrictive transmission mediums is received by a similar sheath 102.

An X-direction first em converter 105, which is in this case a continuous coil (referred to as "X-direction first coil", hereinunder) is wound round one of the axial ends of the sheaths 103 which encase the transmission mediums 101. The X-direction first coil 105 is twisted in the portions thereof which are between respective adjacent sheaths 103, such that the portions of this coil on two adjacent mediums 101 are wound in opposite directions. Therefore, when an electric current is supplied to the coil 105, the magnetic fluxes formed by these portions of the coil 105 have opposite polarities. For the same reason, when a magnetic flux is applied to the coil 105, voltages of the opposite polarities are generated in these portions of the coil 105. Therefore, any noise produced by these coil portions when a pulse current is supplied to the coil 105, as well as any voltages induced in these coil portions by any external factor, are negated by each other to minimize the influence of such noises and voltages. Although in the illustrated embodiment the coil 105 has one turn around each sheath 103, this is only illustrative and the number of turns may be two or more. In the described embodiment, the function of this X-direction first coil is to generate a momentary change in the magnetic field thereby producing magnetostrictive vibration waves in the portions of the magnetostrictive transmission mediums 101 surrounded by the coil 105. The coil 105 is connected at its one end to a pulse current generator incorporated in a position detecting circuit 400 which will be described later, while the other end of the coil 105 is grounded.

A Y-direction first electro-magnetic converter 106 which is in this case a coil (referred to as "Y-direction first coil", hereinunder) is arranged on one of the ends of the sheaths 104 encasing the magnetostrictive transmission mediums 102. The Y-direction first coil 106 is twisted at the portions thereof which are between respective adjacent sheaths 104 such that the portions of this coil 106 on two adjacent magnetostrictive transmission mediums 102 have opposite winding directions. As in the case of the X-direction first coil 105, the Y-direction first coil 106 has one end connected to a pulse current generator and the other end grounded. The function of this coil 106 is the same as that of the coil 105.

Figure 4:
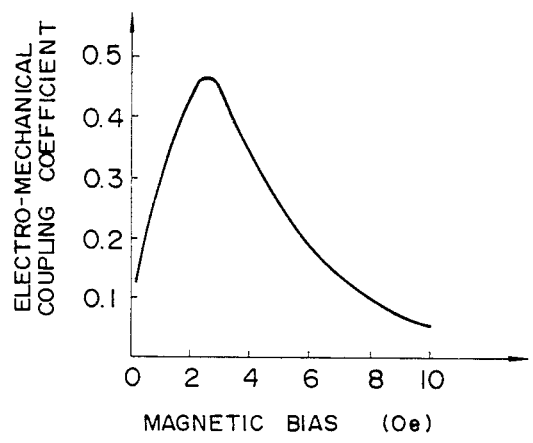
FIG. 4 is a chart showing how an electro-mechanical coupling coefficient is changed in relation to the level of a magnetic bias.

Magnetism generators 107,108 such as angular magnets, used as means for appointing reference positions, are disposed, respectively, along the ends of the magnetostrictive transmission mediums 101 surrounded by the X-direction first coil 105 and the ends of the magnetostrictive transmission mediums surrounded by the Y-direction first coil 106, so as to apply biasing magnetic fields parallel to these magnets. By applying such biasing magnetic fields, it is possible to generate a strong magnetostrictive vibration wave with a small electric current, and to identify the position where the magnetostrictive vibration wave has been produced. More specifically, referring to FIG. 4, the electro-mechanical coupling coefficient, representing the efficiency of conversion from mechanical energy to electric energy and vice versa, of the magnetostrictive transmission mediums 101,102 is maximized when these mediums are under the influence of a certain intensity of biasing magnetic field. By applying biasing magnetic field of such intensity to the portions of the transmission mediums surrounded by respective first coils 105 and 106, it is possible to generate magnetostrictive vibration wave at a high efficiency.

A reference numeral 109 designates an X-direction second electromagnetic converter such as a coil wound around the sheath 103 over a substantial length of each magnetostrictive transmission medium 101. The coils 109 on all magnetostrictive transmission mediums 101 have the same winding direction which is in this case counter-clockwise, and are connected in series such that two adjacent coils have reverse polarities. Therefore, when a magnetic field of a certain polarity is applied to all coils 109, voltages of reverse polarities are produced in adjacent coils 109. For the same reason, when an electric current is supplied to the series connection of the coils 109, magnetic fields of opposite polarities are formed by adjacent coils 109. With this arrangement, therefore, any voltages or noises caused by external factors are negated and weakened.

The pitch of winding of the coil 109 is progressively increased along the length of the magnetostrictive transmission medium 101 from the end closer to the X-direction first coil 105 towards the other end, thus compensating for any reduction in the induced voltage attributable to an attenuation of the magnetostrictive vibration wave. In general, the pitch of this coil 109 is preferably small, in order to allow a large electromotive force to be induced in this coil. The X-direction second coil 109 is intended for detecting any voltage induced by the magnetostrictive vibration wave propagating through the magnetostrictive transmission medium 101. The series connection of the X-direction second coils 109 is connected at its one end to a pulse detector in the position detecting circuit 400 and is grounded at its other end.

A Y-direction second electro-magnetic converter 110, e.g., a coil, is wound around on each sheath 104 over the substantial length of the magnetostrictive transmission medium 102. The coils 110 on all magnetostrictive transmission mediums 102 have the same winding direction which is in this case counter-clockwise, and are connected in series such that the coils 110 on two adjacent magnetostrictive transmission mediums have reverse polarities. The pitch of the coil 110 is progressively increased along the length of the magnetostrictive transmission medium 102 from the end thereof adjacent to the Y-direction first coil 104 towards the other end. The series connection of the Y-direction second coils 110 is connected at its one end to the pulse detector of the position detecting circuit 400 and is grounded at its other end.

The X-direction magnetostrictive transmission mediums 101, sheaths 103, X-direction first coil 105 and the X-direction second coils 109 in combination constitute an X-direction position sensing unit. This unit is placed in a recess formed in the bottom of a non-magnetic metallic case 111. On the other hand, a Y-direction position sensing unit, constituted by the magnetostrictive transmission mediums 102, sheaths 104, Y-direction first coil 106 and the Y-direction second coils 110, is superposed on the X-direction position sensing unit substantially orthogonally thereto, and is fixed by a suitable bond as desired. The reference position appointing magnets 105 and 106 are fixed to the bottom of the metallic case 111 such as to face the ends of the magnetostrictive transmission mediums 101 and 102, at the upper, lower or lateral side of these mediums. A lid 112 made of a non-magnetic metal fits on the metallic case 111.

Figure 5:
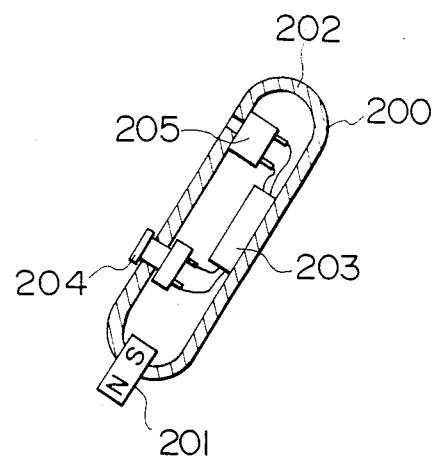
FIG. 5 is a sectional view of a position appointing magnetism generator.
Figure 6:
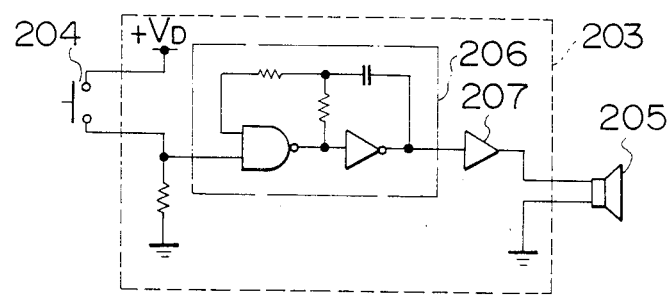
FIG. 6 is an electric circuit diagram showing the electric circuit of the position appointing magnetism generatic.

FIG. 5 is a sectional view of a position appointing magnetism generator, i.e., the magnetic pen 200, while FIG. 6 is a circuit diagram showing the electric circuit thereof. The magnetic pen 200 has a cylindrical bar magnet 201 which is encased by a pen-shaped case 202 with its N-pole directed downwardly. A numeral 203 designates a signal generator adapted for generating a predetermined signal representative of the commencement of the measurement. When an operation switch 204 is turned on, an oscillation circuit 206 constituted by an AND circuit, inverter, resistor and a capacitor starts to oscillate so as to produce a continuous pulse signal of a predetermined frequency representing the commencement of the measurement. The pulse signal is amplified by the amplifier 207 and is converted into a supersonic wave signal which is transmitted from a supersonic wave transmitter 205 to a receiver in the position detecting circuit 400.

A known matrix type liquid crystal display panel having a plurality of horizontal electrodes and a plurality of vertical electrodes which are arranged in a crossing manner with liquid crystal medium interposed therebetween is used as the display 300. The display 300 has a display area which is substantially equal to the input-receiving area on the tablet 100, and is superposed on the tablet 100 in such a way that the coordinate position on the tablet geometrically coincides with the coordinate position on the display 300.

Figure 7:
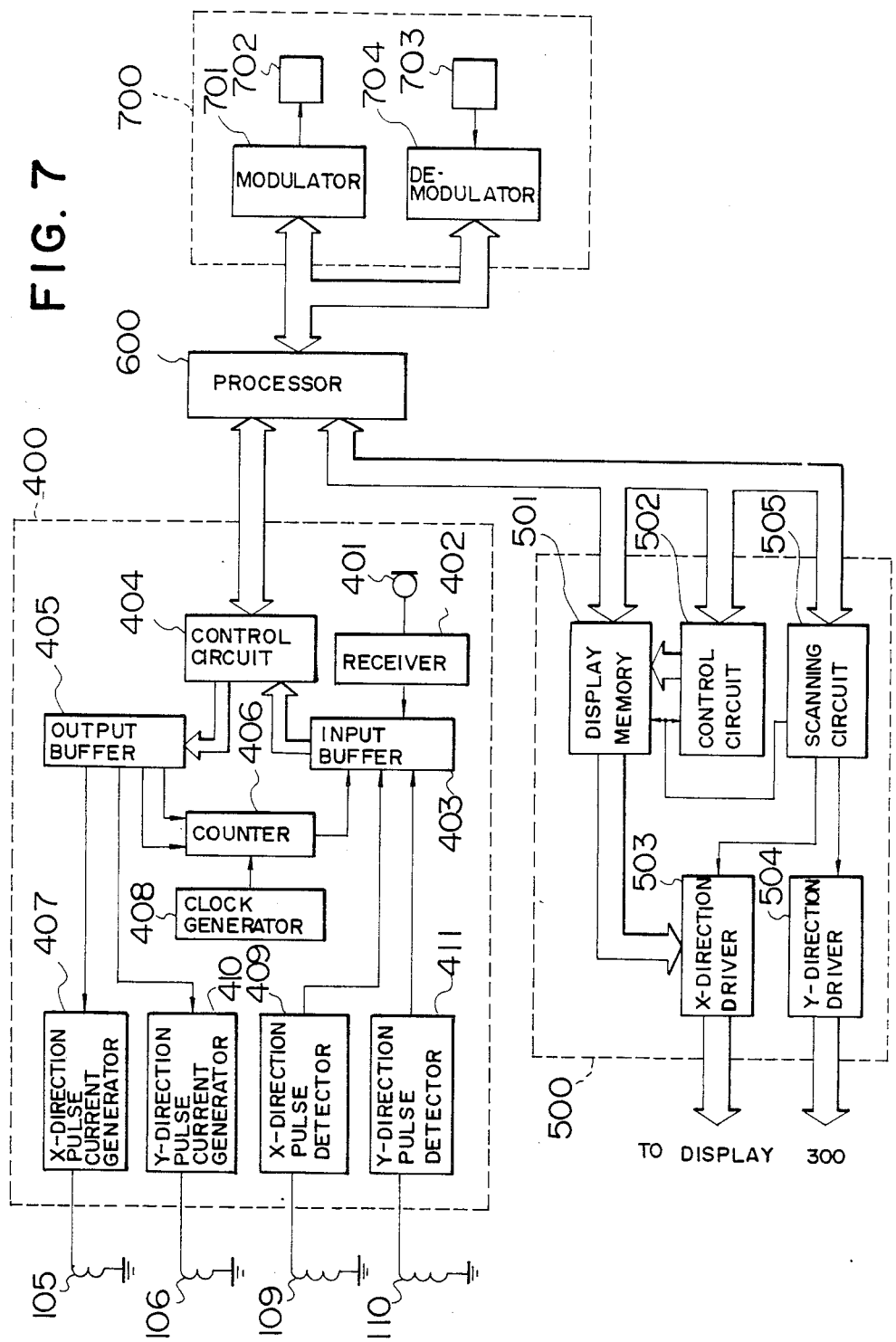
FIG. 7 is a block diagram of the whole system.

The operation of the coordinate input system with display in accordance with the invention will be described hereinunder with reference to FIG. 6 showing the electric circuit of the magnetic pen 200 and FIG. 7 which is a block diagram of the whole system.

It is assumed here that the magnetic pen 200 is positioned above the magnetostrictive transmission medium 101 which is spaced by a distance $l_1$ in the X-axis direction from the center of the X-direction first coil and above the magnetostrictive transmission medium 102 which is spaced by a distance $l_2$ in the Y-direction from the center of the Y-direction first coil 106, and is applying to these magnetostrictive transmission mediums a magnetic flux of an intensity just sufficient to cause an appreciable increase in the electro-mechanical coupling coefficient, across the thickness of the display 300.

In this state, when the operation switch 204 of the magnetic pen 200 is turned on, a supersonic wave signal indicative of the commencement of the measurement is transmitted from the wave transmitter 205. This supersonic wave signal is received by the wave receiver 401 and is converted into an electric signal. This electric signal is then amplified and shaped by the receiver 402 and is delivered to an input buffer 403. A control circuit 404 reads out from the input buffer 403 the signal indicative of the commencement of the measurement, thus acknowledging the commencement of the measurement. The control circuit 404 then resets the counter 406 through the output buffer 405 and activates the X-direction pulse current generator 407. The counter 406 then starts to count the clock pulses generated by the clock generator 408. The frequency of the clock pulses is, for instance, 100 MHz.

Then, the X-direction pulse current generator 407 starts to operate and supply a pulse current to the X-direction first coil 105, so that the X-direction first coil 105 causes a momentary change in the magnetic flux, thus generating magnetostrictive vibration waves in the portions of the magnetostrictive transmission mediums 101 surrounded by this coil 105. The thus generated magnetostrictive vibration wave propagates through the magnetostrictive transmission mediums 101 in the longitudinal direction at a velocity (about 5000 m/sec in the illustrated case) peculiar to the magnetostrictive transmission medium. During the propagation of the magnetostrictive vibration wave, conversion from mechanical energy into magnetic energy is conducted every moment at the instant position of the magnetostrictive vibration wave. The conversion is made at an efficiency which is determined by the electro-mechanical coupling coefficient of the portion of the magnetostrictive transmission medium where the magnetostrictive vibration wave exists. As a result of the conversion, an electromotive force is induced in the X-direction second coil 109.

Figure 8:
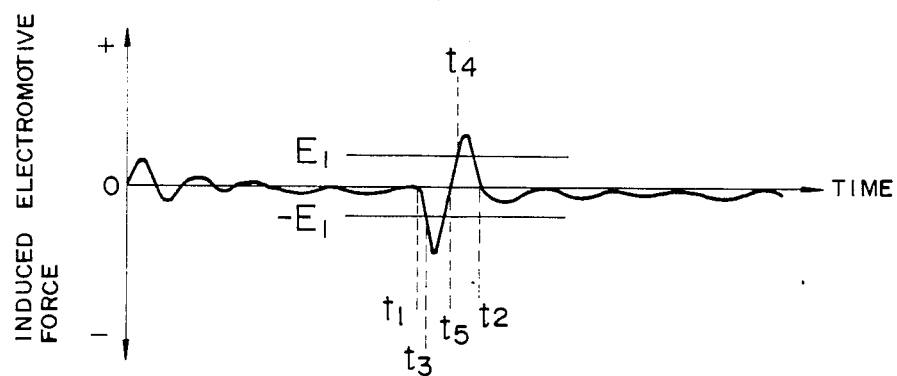
FIG. 8 is a diagram showing, by way of example, a change in the electromotive force induced in an X-direction second coil incorporated in the tablet.

FIG. 8 shows how the electromotive force induced in the X-direction second coil 109 is changed in relation to time. The moment at which the pulse current is applied to the X-direction first coil 105 is represented as $t=0$. As will be seen from FIG. 8, the amplitude of the induced electromotive force has a first peak which appears immediately after the moment $t=0$ and second peaks appearing during a period between moments $t_1$ and $t_2$. The peak value of the electromotive force appearing immediately after the moment $t=0$ is attributable to the mutual electromagnetic induction between the X-direction first coil 105 and the X-direction second coil 109, while the peaks appearing in the period between the moments $t_1$ and $t_2$ are attributable to the fact that the magnetostrictive vibration wave, which was generated in the portion of the magnetostrictive transmission medium 101 surrounded by the X-direction first coil 105 and propagated through the magnetostrictive transmission medium 101 has reached a position immediately below the magnetic pen 200 where the electro-mechanical coupling coefficient is increased by the magnetic field produced by the magnetic pen 200. Therefore, when the magnetic pen 200 is moved along the length of the magnetostrictive transmission medium 101, i.e., in the X-direction, the position of the peak of the voltage induced by the magnetostrictive vibration wave moves along the time axis. Therefore, by measuring the propagation time between the moment $t_0$ and the period $t_1-t_2$, it is possible to know the distance $l_1$, i.e., the position appointed by the magnetic pen 200 in the X-direction. Referring to FIG. 8, the moment $t_3$ at which the induced voltage has come down below a predetermined threshold $-E_1$ or a moment $t_4$ at which another threshold $E_1$ is exceeded by the induced voltage can be used as the basis for the measurement of the propagation time. Even a zero-cross point $t_5$ may be used as such a basis.

The electromotive force generated in the X-direction second coil 109 is delivered to an X-direction pulse detector 409. The X-direction pulse detector 409 includes an amplifier, comparator and other elements, and produces an output of high level throughout the period in which the electromotive force is greater than the threshold value $E_1$, i.e., when the positive polarity portion of the voltage induced by the magnetostrictive vibration wave is being detected. The control circuit 404 delivers, upon reading this high-level signal through the input buffer 403, a counting stop signal to the counter 406 through the output buffer 405, thereby stopping the counting operation. A digital value corresponding to the time duration between the moment at which the pulse current is supplied to the X-direction first coil 105 and the moment at which a voltage induced by the magnetostrictive vibration wave appears in the X-direction second coil 109 is therefore obtained in the counter 406. Since the magnetostrictive vibration wave propagates at a constant velocity of 5000 m/sec, this digital value corresponds to the distance $l_1$ in the X-direction between the X-direction first coil 105 and the position appointed by the magnetic pen 200. The X-direction position data thus obtained in the form of a digital value in the counter 406 is read by the control circuit 404 through the input buffer 403 and is temporarily stored in the processing circuit 600.

Then, the control circuit 404 resets the counter 406 again and operates the Y-direction pulse current generator 410. The control circuit 404 watches the output of the Y-direction pulse detector 411 and obtains the Y-direction position data concerning the position appointed by the magnetic pen 200. The thus obtained data is delivered to the processing circuit 600.

The operation described hereinabove is repeated so that the X- and Y-direction position data concerning the points successively appointed by the magnetic pen 200 are obtained and stored in the processing circuit 600.

The position data stored in the processing circuit 600 and constituted by the X- and Y-direction data is delivered to the display memory 501 and is stored in the memory in a predetermined order or sequence. The position data thus stored in a predetermined order is successively read out from the display memory 501 in accordance with timing pulses which are delivered by the control circuit 502. The X-direction position data read out from the display memory is delivered to an X-direction driver 503, while the Y-direction position data read out from the display memory 501 is delivered to a Y-direction driver 504. The X-direction driver 503 and the Y-direction driver 504 receive scanning pulses which are produced by a scanning circuit 505 in synchronization with the timing pulses produced by the control circuit 502. In response to these scanning pulses, the drivers 503 and 504 drive the electrodes on the display 300 corresponding to the X- and Y-direction position data, so that the position on the tablet 100 appointed by the magnetic pen 200 is displayed at the identical position on the display 300. Thus, the characters and patterns scribed by the magnetic pen 200 across the thickness of the display 300 are displayed by luminescence on the display 300 itself, as if these characters and patterns had been directly "written" with the magnetic pen 300 on the display 300.

On the other hand, the position data stored in the processing circuit 600 is delivered to a modulating circuit 701 in the acoustic coupler 700 and is modulated into a signal of acoustic band. The modulated signal is then converted into an acoustic signal by a speaker 702 and is transmitted to another station through the telephone 800 and the telephone circuit 900. If another station is equipped with a similar coordinate input device with display, the characters and patterns thus transmitted can be displayed on the display of another station. Similarly, the position data transmitted from another station is inputted to the processing circuit 600 through a microphone 703 and a demodulating circuit 704, and is temporarily stored in the processing circuit 600. The thus stored position data can be displayed on the display 300 through the display control circuit 500 in the manner described before. If the processing circuit 600 is equipped with an editing function and pattern processing function, the characters and patterns inputted to the tablet 100 can be freely edited through insertion, deletion, correction and so forth, while the edited information is displayed on the display 300 as well as on the display of another station.

In the described embodiment, the magnetostrictive vibration waves are produced by the X-direction first coil 105 and the Y-direction first coil 106, while the X-direction second coil 2 and the Y-direction second coil are used as the detecting coils for detecting the magnetostrictive vibration waves. This arrangement, however, is only illustrative and the arrangement may be such that the X- and Y-direction second coils are used for the generation of the magnetostrictive vibration waves, while the X- and Y-first coils are used as the detecting coils. Namely, in this case, the magnetostrictive vibration waves are generated in the portions of the magnetostrictive transmission mediums immediately below the magnetic pen 200, and the electromotive forces are induced in respective first coils 109 and 110.

It is to be understood that the term "electromagnetic converter" referred to in this specification generally includes elements and devices capable of conducting a conversion from a change in the magnetic field (magnetic flux) into a change in voltage and current and vice versa. Although the described embodiment employs coils as the electromagnetic converters by way of example, the invention does not exclude the use of other types of electromagnetic converter. For instance, the X-direction first coil and the Y-direction first coil may be substituted by magnetic heads. The use of such magnetic heads minimizes the external leak of the magnetic flux and ensures a higher precision of detection of the coordinate position.

As will be understood from the foregoing description, the invention offers various advantages as summarized below.

The coordinate input device with display in accordance with the invention permits a highly precise inputting of the coordinate position data into a tablet by means of a position appointing magnetism generator from a remote place on or above the display across the thickness of the display superposed on the tablet, as well as a visual check of the inputted data by means of the display on the tablet. Therefore, the user is relieved of the trouble of watching both the tablet and display alternate, which trouble is unavoidable in the conventional system having a display separate from the tablet.

It is to be understood also that the characters and patterns inputted by hand writing can be transmitted to another station through telecommunication line such as a telephone circuit, and also to display the characters and patterns which are transmitted from another station. This eliminates the necessity for the use of a sheet of paper which is essential in the known telecopier or facsimile machine.

In addition, since the display is superposed on the tablet, it is possible to eliminate troubles such as doubling of character and pattern lines due to angular parallax.

Furthermore, the position appointing magnetism generator need not be connected to the stationary part of the system through a cord, because it is not necessary to pick up the timing at which the intensity of magnetic field is changed or the timing at which the magnetic field intensity is changed. Consequently, the maneuverability is improved remarkably thus facilitating the inputting of the coordinate position data.

In addition, since the position appointing magnetism generator is required only to apply a small biasing magnetic field to the tablet, it is not necessary to use the position appointing magnetism generator in close proximity to the tablet. Rather, inputting can be carried out with the magnetism generator from a position remote from the top surface of the display, while at the same time the input is received on the underside thereof. The inputting of the coordinate data is possible even when the display is covered by a member of a material other than magnetic metallic materials. The type, thickness and other aspects of the display can be selected from a wide range without impairing the performance of the system.

Although the invention has been described through specific terms, it is to be noted here that the described embodiment is only illustrative and various changes and modifications may be imparted thereto without departing from the scope of the invention which is limited solely by the appended claims.

What is claimed is:

1. A coordinate input device with display comprising:
   a tablet having a plurality of X-direction magnetostrictive transmission mediums arranged in parallel, a plurality of Y-direction magnetostrictive transmission mediums arranged in parallel and superposed on said X-direction transmission mediums substantially orthogonally thereto, and first and second electromagnetic converters arranged over substantial regions of said magnetostrictive transmission mediums;
   a tabular display superposed on said tablet and having a display area substantially equal to the position detection area on said tablet;
   a position appointing magnetism generator capable of producing a magnetism just enough for causing a local increase of electro-mechanical coupling coefficient in said magnetostrictive transmission mediums in said tablet;
   a position detecting circuit adapted to supply a pulse current to one of said first and second electromagnetic converters such as to generate magnetostrictive vibration wave in a reference position on each magnetostrictive transmission medium or a position appointed by said position appointing magnetism generator, said position detecting circuit being further adapted to measure the time duration between the moment at which said magnetostrictive vibration wave is generated and a moment at which said magnetostrictive vibration wave has reached the appointed position or said reference position, thereby detecting the coordinate values of the position appointed by said position appointing magnetism generator;
   a display control circuit adapted for driving said display in such a manner that the position corresponding to said coordinate values is displayed on said display;
   a signal modulating/demodulating circuit adapted for converting the position data expressed by said coordinate values into a signal suitable for transmission through a transmission line and vice versa; and
   a processing circuit for controlling said position detecting circuit, said display control circuit and said modulating/demodulating circuit.

2. A coordinate input device with display as set forth in claim 1, wherein said magnetostrictive transmission mediums are made of an amorphous alloy.

3. A coordinate input device with display as set forth in claim 1, wherein said first and second electromagnetic converters are constituted by coils.

4. A coordinate input device as set forth in claim 1, wherein said display is constituted by a matrix-type liquid crystal display device having a plurality of horizontal electrodes and a plurality of vertical electrodes which are arranged to cross each other with a liquid crystal medium interposed therebetween.

5. A coordinate input device with display comprising:
   a tablet having a plurality of X-direction magnetostrictive transmission mediums arranged in parallel, a plurality of Y-direction magnetostrictive transmission mediums arranged in parallel and superposed on said X-direction transmission mediums substantially orthogonally thereto, and first and second coils arranged over substantial regions of said magnetostrictive transmission mediums;
   a plurality of biasing magnetic bodies adapted to apply a biasing magnetic field to the portions of said magnetostrictive transmission mediums surrounded by said first and second coils;
   a tabular display superposed on said tablet and having a display area substantially equal to the position detection area on said tablet;
   a position appointing magnetism generator capable of producing a magnetism just enough for causing a local increase of electro-mechanical coupling coefficient in said magnetostrictive transmission mediums in said tablet;
   a position detecting circuit adapted to supply a pulse current to one of said first and second coils such as to generate magnetostrictive vibration wave in a reference position on each magnetostrictive transmission medium or a position appointed by said position appointing magnetism generator, said position detecting circuit being further adapted to measure the time duration between the moment at which said magnetostrictive vibration wave is generated and a moment at which said magnetostrictive vibration wave has reached the appointed position or said reference position, thereby detecting the coordinate values of the position appointed by said position appointing magnetism generator;
   a display control circuit adapted for driving said display in such a manner that the position corresponding to said coordinate values is displayed on said display;
   a signal modulating/demodulating circuit adapted for converting the position data expressed by said coordinate values into a signal suitable for transmission through a transmission line; and
   a processing circuit for controlling said position detecting circuit, said display control circuit and said modulating/demodulating circuit.

* * * * *

UNITED STATES PATENT AND TRADEMARK OFFICE
CERTIFICATE OF CORRECTION

PATENT NO. : 4,609,776

DATED : September 2, 1986

INVENTOR(S) : Murakami, et al.

It is certified that error appears in the above-identified patent and that said Letters Patent is hereby corrected as shown below:

Column 2, line 53, "generatic" should be --generator--.

Column 9, line 48, "pen 300" should be --pen 200--.

Column 10, line 7, "coil 2" should be --coil 109--;

line 8, "coils" should be --coils 110--;

line 18, "first coils" should be --second coils--;

line 45, "alternate" should be --alternately--;

lines 63 and 63, "at which the intensity of magnetic field is changed or the timing" should be deleted.

Signed and Sealed this

Third Day of March, 1987

Attest:

DONALD J. QUIGG

Attesting Officer

Commissioner of Patents and Trademarks